United States Patent [19]

Goldish et al.

[11] 3,996,957

[45] Dec. 14, 1976

[54] INFLATOR VALVE WITH PRESSURE GAUGE AND SAFETY REGULATOR

[75] Inventors: Milton Goldish; Stanley J. Majewski, both of Chicago, Ill.

[73] Assignee: Milton Industries, Inc., Chicago, Ill.

[22] Filed: Sept. 12, 1975

[21] Appl. No.: 612,867

[52] U.S. Cl. .............................. 137/224; 137/469
[51] Int. Cl.² ........................................ F16K 15/20
[58] Field of Search .......... 137/224, 228, 227, 469, 137/472, 473; 152/415; 141/38; 73/146.3

[56] References Cited

UNITED STATES PATENTS

| 1,652,675 | 12/1927 | Key .................................. 137/227 |
| 2,165,611 | 7/1939 | Campbell ...................... 137/472 X |
| 2,173,369 | 9/1939 | McElroy ............................ 137/224 |
| 2,320,339 | 6/1943 | Buttner .............................. 137/469 |
| 2,501,801 | 3/1950 | Wallin ................................ 137/224 |
| 2,933,098 | 4/1960 | Lisiak ............................ 137/228 X |
| 3,074,457 | 1/1963 | Tubbs ............................ 137/227 X |
| 3,429,332 | 2/1969 | Mazeika ............................ 137/227 |

Primary Examiner—Harold W. Weakley
Attorney, Agent, or Firm—Edward C. Threedy

[57] ABSTRACT

An improvement in an inflator valve, pressure gauge, and automatic pressure-responsive relief valve, all of which are combined into an integral hand-held and operated device for use in high pressure inflating applications.

3 Claims, 5 Drawing Figures

INFLATOR VALVE WITH PRESSURE GAUGE AND SAFETY REGULATOR

SUMMARY OF THE INVENTION

The principal object of the present invention is to provide in a hand-held and operated device an integral structure including an inflator valve by which fluid pressure is valved into inflatable objects, a pressure-indicating gauge to determine the degree of pressure within the inflated object, and a predeterminable safety pressure-responsive relief valve to prevent over-pressurization of the inflator valve and inflatable objects.

Prior devices have been available whereby the inflator valve is automatically rendered inoperative to continue to inflate an object upon the achievement of a predetermined pressure value, such as the device shown, described and claimed in U.S. Pat. No. 2,501,801. However, in such prior devices, no safety feature is achieved by reason of the fact that, while the device disconnects inflatable pressure into the inflatable object, it does not relieve continuing build-up of pressure in the valve per se.

Thus, while the prior art devices may function to prevent over-inflation of an inflatable object, they do not provide an adjustable predetermined pressure relief for the valve structure due to the continuing introduction of fluid pressure from an unlimited supply source into the valve per se. The present structure overcomes this defect in safety of operation.

GENERAL DESCRIPTION

The invention will be best understood by reference to the accompanying drawings showing the preferred form of embodiment of the invention, and in which.

Figure 1:
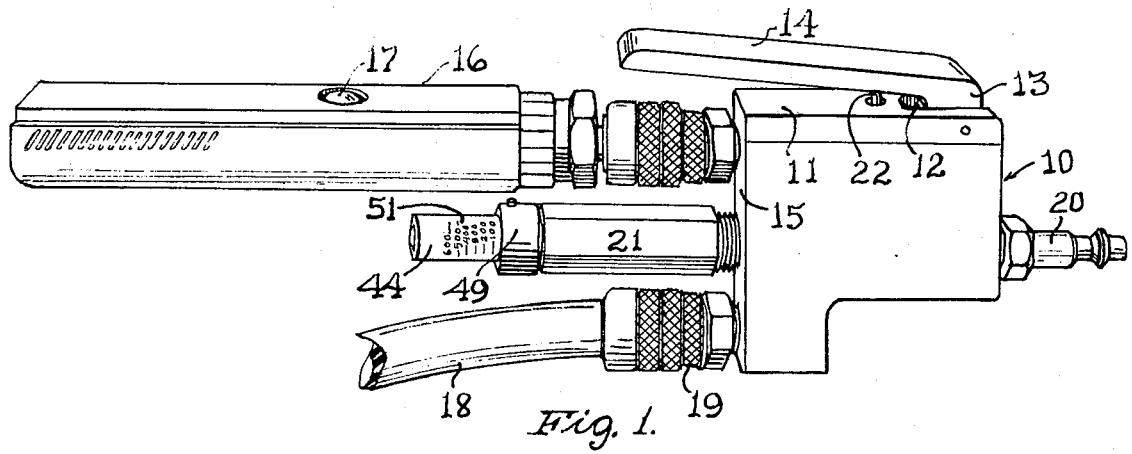
FIG. 1 is a perspective view of the inflator valve with a pressure gauge and safety regulator.

The invention includes a valve housing 10 which provides a top wall 11 which is recessed at one end as at 12 so as to pivotally receive one end 13 of an operating lever 14. Connected to one side wall 15 of the housing 10 is a valve gauge barrel 16. As shown, the valve gauge barrel 16 includes a viewing window 17 through which a scaled gauge may be readily viewed to determine the inflated pressure of an inflatable object (not shown).

Also connected to the side wall 15 of the valve housing 10 is an outlet hose 18 having a normal removable coupling 19 adapted to connect the same to the valve housing 10. Adapted to be connected to an opposite side wall of the valve housing 10 is an inlet opening 20, which may be readily connected to a fluid pressure supply line (not shown).

Intermediate the gauge barrel 16 and the outlet hose 18 is a pressure-responsive relief valve structure 21. It should be noted that as the valve housing 10 is adapted to be hand-held and operated, the operating lever 14, as well as the gauge barrel 16, outlet hose 18, and pressure-responsive relief valve housing 21 all extend in the same general direction for a purpose hereinafter made apparent.

The valve housing 10 may include a valve structure such as that shown in U.S. Pat. No. 3,429,332, but is not necessarily limited to such structure, and any operative valve may be included in the device which permits selective communication from the fluid pressure supply source to the different components of the invention.

Figure 5:
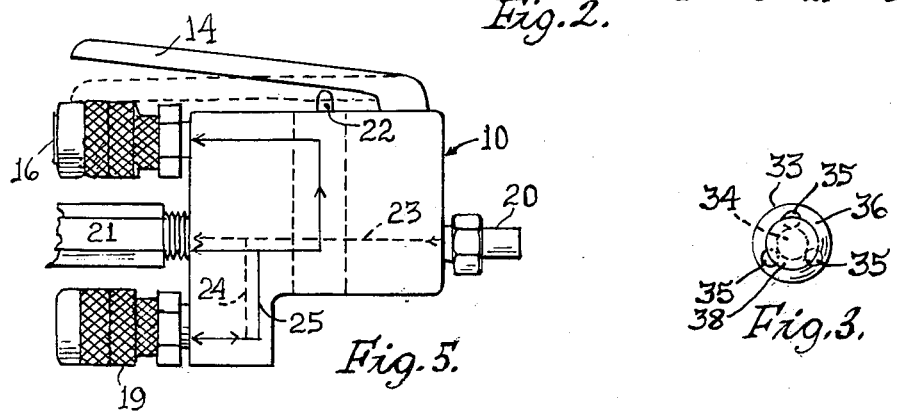
FIG. 5 is a schematic drawing showing the lines of fluid pressure communication within the inflator valve.
Figure 3:
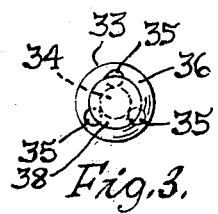
FIG. 3 is an end view of the piston of the pressure-responsive relief valve.

Before describing the construction and operation of the pressure-responsive relief valve, attention is directed to FIG. 5, wherein there is schematically shown the paths of communication of the fluid pressure within the valve housing 10 under different circumstances. As such, fluid pressure is admitted into the valve housing 10 through the inlet connector 20. In such a condition the valve is inoperative. However, when the operating lever 14 is depressed into the dotted line position shown in FIG. 5, it will depress the valve stem 22 and open the line of communication illustrated by the dotted line 23. As such, the fluid pressure from the supply source will now pass into the valve housing 10, continue through the line 23, directly into the pressure-responsive relief valve housing 21 and through the branch line 24, out through the outlet coupling 19, through the hose 18 to an inflatable object.

Upon release of the operating lever 14, the fluid passage line of communication 25 is opened, which comes in a reverse direction from the inflatable object, as well as the fluid pressure-responsive valve housing 20, into the gauge barrel 16, where it will operate a scaled inflator gauge, such as that shown in the aforementioned U.S. Pat. No. 3,429,332.

It is the purpose of this invention to prevent accidental over-inflation of an inflatable object. In high pressure applications, such as aircraft tires and the like, it may be required that the inflatable object attain an inflated condition where the pressures may exceed 600 pounds. In such a situation, any over-inflation and resulting explosion is highly dangerous. The present invention will prevent such an accident and afford complete safety to the operation of this apparatus. This is accomplished through the pressure-responsive valve which is contained in the valve housing 21.

Figure 2:
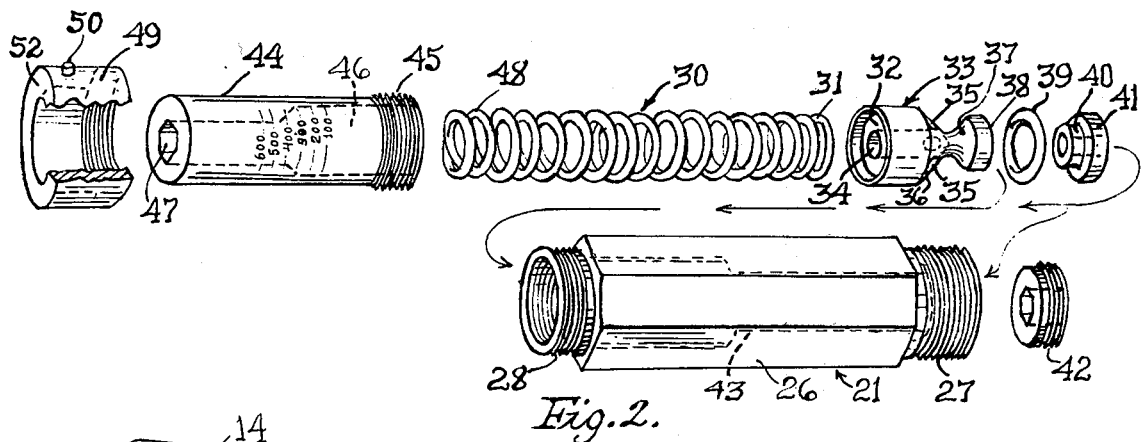
FIG. 2 is a perspective view of the components of the pressure-responsive relief valve of the invention shown in exploded relationship.
Figure 4:
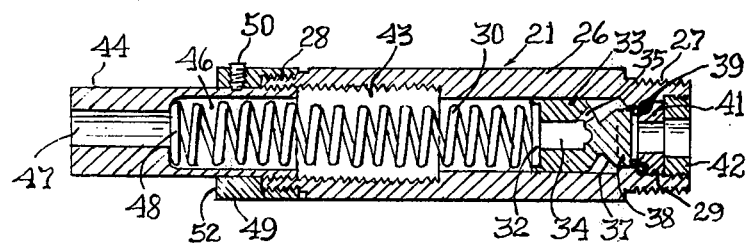
FIG. 4 is a detailed sectional view of the pressure-responsive relief valve in assembled condition.

As shown in FIGS. 2 and 4, the valve housing 21 comprises an elongated hollow body 26 which provides at each end a threaded coupling 27 and 28. The threaded coupling 27 (FIG. 4) includes a stepped internal chamber 29. Within the body 26 is adapted to be disposed a coil spring 30, one end 31 of which is adapted to sit within a recess 32 formed in one end of a slidable piston 33.

The piston 33 is provided with a concentric air passage 34 which has communication with openings 35 formed in a tapered face 36 of the piston 33. This tapered face 36 terminates into a neck 37 which provides a circular seat 38. The circular seat 38 of the piston 33 is adapted to sit within the narrowest portion of the stepped bore or chamber 29 formed in the one end of the valve body 26 (FIG. 4). An O-ring 39 is adapted to be carried on the reduced end 40 of a carrier plate 41 and which is adapted to be positioned within the stepped bore 29 so that the O-ring 39 will bear against the valve seat 38 to seal the same. A closure disc 42 is adapted to be threaded into the internally threaded bore 29 so as to hold the parts in relation, as indicated. The closure disc 42 and carrier plate 41 are provided with a center opening through which fluid pressure may be introduced into the valve housing 21.

Threaded into the internally threaded bore 43 of the valve body 26 through the other end 28 of the valve body 26, is a pressure indicator 44. This pressure indicator 44 comprises a hollow circular tube threaded at one end as at 45 and which provides a center bore 46 and a counterbore 47 of a smaller diameter, and extends out of the exposed end of the pressure indicator 44. The opposite end 48 of the spring 30 is adapted to seat within the bore 46 of the pressure indicator 44 when the indicator 44 is threaded into the internally threaded bore 43 of the valve body 26 of the valve housing 21. A retaining collar 49 is adapted to be threaded into the end 28 of the valve body 26, as shown in FIGS. 1 and 4. This retaining collar 49 provides a set screw 50 for a purpose hereinafter made apparent.

The wall of the pressure indicator 44 is provided with a graduated scale 51 calibrated to provide a visual indication of the pressure required to be applied onto the piston to overcome the expansion force of the spring 30.

In operation, the operator of the device will determine the necessary pressure required to be introduced into the inflatable object through the valve housing 10 and will rotate the indicator 44 in either a clockwise or an anticlockwise direction until the desired scale reading is in alignment with the exposed edge 52 of the retaining collar 49. This will indicate at what pressure within the valve 21 the piston 33 will overcome the force of the spring 30. The operator will tighten the set screw 50 so as to hold the indicator 44 in such a preselected position.

The operator may then depress the operating lever 14 whereby fluid pressure will be introduced through the valve housing 10 and hose 18 to the inflatable object. If the operator inadvertently maintains the operating lever 24 in its depressed position beyond the required pressure of the inflatable object, a back pressure will be created through the lines of communication 23 and 24, as indicated in FIG. 5, into the pressure-responsive safety valve housing 21, and it will cause the piston 33 to be moved out of its contact with the O-ring 39, permitting a blow-out of excess pressure through the valve body 26. It is noted that both the outlet hose 18, and the pressure-responsive relief valve housing 21, as well as the pressure gauge barrel 16, all extend in the same direction from the valve housing 10. Thus, when the operator has inadvertently operated the inflator valve to cause a blow-out, the blow-out will be in a direction away from the operator, causing no accident or damaging effects. At any time the operator may release the operating lever 14 and obtain a pressure reading through the window 17 of the gauge barrel 16 in a manner well known in the art.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. An inflator valve having a hand-operated flow control valve, wherein the improvement comprises
   a. a housing for the flow control valve having a pressure supply intake port in one edge wall and a pressure gauge and outlet port in the opposite edge wall,
   b. an elongated pressure-responsive relief valve carried by said housing and extending from said opposite edge wall thereof between the outlet port and the pressure gauge,
   c. said pressure-responsive relief valve providing a center exhaust bore extending longitudinally therethrough and having direct communication through the flow control valve with the pressure supply intake port and the outlet port and alternate communication with the outlet port and the pressure gauge,
   d. a spring-biased slidable piston carried within said pressure-responsive relief valve for controlling a predetermined amount of pressure flowing into the inflator valve housing from the pressure supply intake port and out the outlet port,
   e. a gauge tube threadable into the center exhaust bore of said pressure-responsive relief valve so as to adjust the spring bias against said piston to regulate the amount of pressure within said housing required to slidably move said piston longitudinally within said center bore of said pressure relief valve to vent exhaust pressure therethrough into the atmosphere, and
   f. indicia on said gauge tube to visually indicate the pressure-responsive condition of the valve.

2. An inflator valve as defined by claim 1 further including means for releasably locking said gauge tube in a preselected threaded position relative to said one end of said pressure-responsive relief valve.

3. An inflator valve as defined by claim 1 wherein said pressure-responsive relief valve includes an elongated hollow body, a slidable piston and piston seat in one end of said body and in open communication with the inflator valve, an adjustable gauge tube in the opposite end of said body and threadably movable longitudinally therethrough, and an expansion spring within said body and disposed within said piston and said gauge tube for releasably bearing said slidable piston upon said piston seat so as to prevent a predetermined amount of pressure from being exhausted therethrough.

* * * * *